United States Patent [19]

Lucore, II

[11] Patent Number: 4,723,710
[45] Date of Patent: Feb. 9, 1988

[54] APPARATUS FOR SPRAYING MIXTURES OF SOLID AND LIQUID MATERIALS

[76] Inventor: James C. Lucore, II, 1945 Mariner La., Woodbridge, Va. 22192

[21] Appl. No.: 894,807

[22] Filed: Aug. 8, 1986

[51] Int. Cl.⁴ .............................................. B05B 13/00
[52] U.S. Cl. .................................... 239/124; 239/127; 239/142; 239/172
[58] Field of Search ............... 239/106, 124, 125, 127, 239/142, 172

[56] References Cited

U.S. PATENT DOCUMENTS

| | | | |
|---|---|---|---|
| 2,878,617 | 3/1959 | Finn | 239/127 X |
| 2,988,286 | 6/1961 | Snyder et al. | 239/127 X |
| 3,125,294 | 3/1964 | Lill | 239/127 X |
| 3,147,922 | 9/1964 | Warner | 239/127 |
| 3,459,375 | 8/1969 | Gofin | 239/127 |
| 3,463,397 | 8/1969 | Mecklin et al. | 239/127 X |
| 3,512,713 | 5/1970 | Carlyon, Jr. | 239/127 |
| 3,638,860 | 2/1972 | Carlyon, Jr. | 239/127 |
| 4,216,907 | 8/1980 | Fuller | 239/127 |

FOREIGN PATENT DOCUMENTS 3401734  8/1985  Fed. Rep. of Germany ...... 239/127

Primary Examiner—Andres Kashnikow
Assistant Examiner—Mary Beth O. Jones
Attorney, Agent, or Firm—Browdy and Neimark

[57] ABSTRACT

An apparatus for spraying mixtures of solid and liquid materials includes a tank; a pump; an inlet line from the tank to the pump; a return line from the pump to the tank; a spraying nozzle; a nozzle supply line from the pump to the nozzle; a nozzle to the tank; and first and second valves for regulating the respective amounts of mixtures to be fed either to the nozzle, the nozzle supply line, the nozzle return line or the return line from the pump to the tank. By providing two separate valves and return lines, one at the pump and one at the nozzle, constant agitation of the tank contents is maintained and clogging anywhere in the system, particularly in the nozzle hose, is avoided.

11 Claims, 5 Drawing Figures

APPARATUS FOR SPRAYING MIXTURES OF SOLID AND LIQUID MATERIALS

FIELD OF THE INVENTION

The present invention relates to apparatus for spraying mixtures of solid and liquid materials, and more particularly, to agricultural apparatus for spraying mixtures composed of seed, mulch and water onto any desired area efficiently and without the inconvenience of system clogging.

BACKGROUND OF THE INVENTION

Agricultural apparatus for spraying fields with mixtures of seed, water, mulch and/or fertilizers have been well-known for many years. Most of these systems include a vehicle-mounted tank holding the mixture; a pump; a discharge nozzle for spraying the mixture; and hosing for delivering the mixture under pressure (via the pump) from the tank to the discharge nozzle. Some of these spraying systems are provided with structure near the pump outlet to cause continuous circulation of the mixture, through the use of special valving, even when the nozzle is not in use, thereby feeding back or recirculating a portion or all of the mixture back to the tank. This is particularly beneficial in facilitating constant agitation of the mixture, preventing stratification or settling out of the mixture's solid particles in the tank and hosing, which would otherwise cause a non-uniform spray and a disproportionate mixture of chemicals.

U.S. Pat. Nos. 2,878,617 to Finn; 3,147,922 to Warner; 3,512,713 and 3,638,860 to Carlyon, Jr., all disclose vehicle-mounted agricultural apparatus for spraying mixtures of solid and liquid materials composed of seed, mulch, water and/or fertilizer, including a tank; a pump; a discharge nozzle; and hosing for delivering the mixture, under pressure via the pump, to the discharge nozzle. These prior art systems are provided with valve means to feed-back or recirculate a portion or all of the mixture to the tank, particularly when the nozzle is not in use. However, while these above-mentioned systems may assure non-clogging of mixture in the system's circulatory path and promote a uniform spray of equal chemical mixture, no means is incorporated to prevent clogging of the mixture at the nozzle or in the nozzle's delivery line.

Consequently, arrangements to eliminate system clogging by continually recirculating the mixture, are unsuccessful in preventing clogging of the mixture at or near the discharge nozzle.

SUMMARY OF THE INVENTION

Accordingly, it is an object of the present invention to eliminate the deficiencies of the prior art, such as those set forth hereinabove.

It is a further object of the present invention to provide an improved apparatus for spraying mixtures of solid and liquid materials.

It is yet another object of the present invention to provide an improved apparatus for spraying mixtures composed of seed, water, mulch and/or fertilizer.

It is still another object of the present invention to provide an apparatus for spraying mixtures of solid and liquid materials which will eliminate clogging of the mixture throughout the entire system, particularly at the system's discharge nozzle when the nozzle is not in use.

It is another object of the present invention to provide an apparatus for spraying mixtures of solid and liquid materials which will dispense a uniform spray of proportionate component parts.

It is still another object of the present invention to provide an apparatus for spraying mixtures of solid and liquid materials equipped with means to control the flow of the mixture being dispensed from the system's discharge nozzle as well as the flow of the mixture being recirculated throughout the system.

It is another object of the present invention to provide an improved vehicle-mounted apparatus for spraying mixtures of solid and liquid materials.

It is still another object of the present invention to provide an apparatus for spraying mixtures of solid and liquid materials which eliminates the need for an in-tank agitator.

It is another object of the present invention to provide an apparatus for spraying mixtures of solid and liquid materials easily and inexpensively.

Still other objects, features and attendant advantages of the present invention will become apparent to those skilled in the art from a reading of the following detailed description of embodiments constructed in accordance therewith, taken in conjunction with the accompanying drawings.

DESCRIPTION OF PREFERRED EMBODIMENTS

Figure 1:
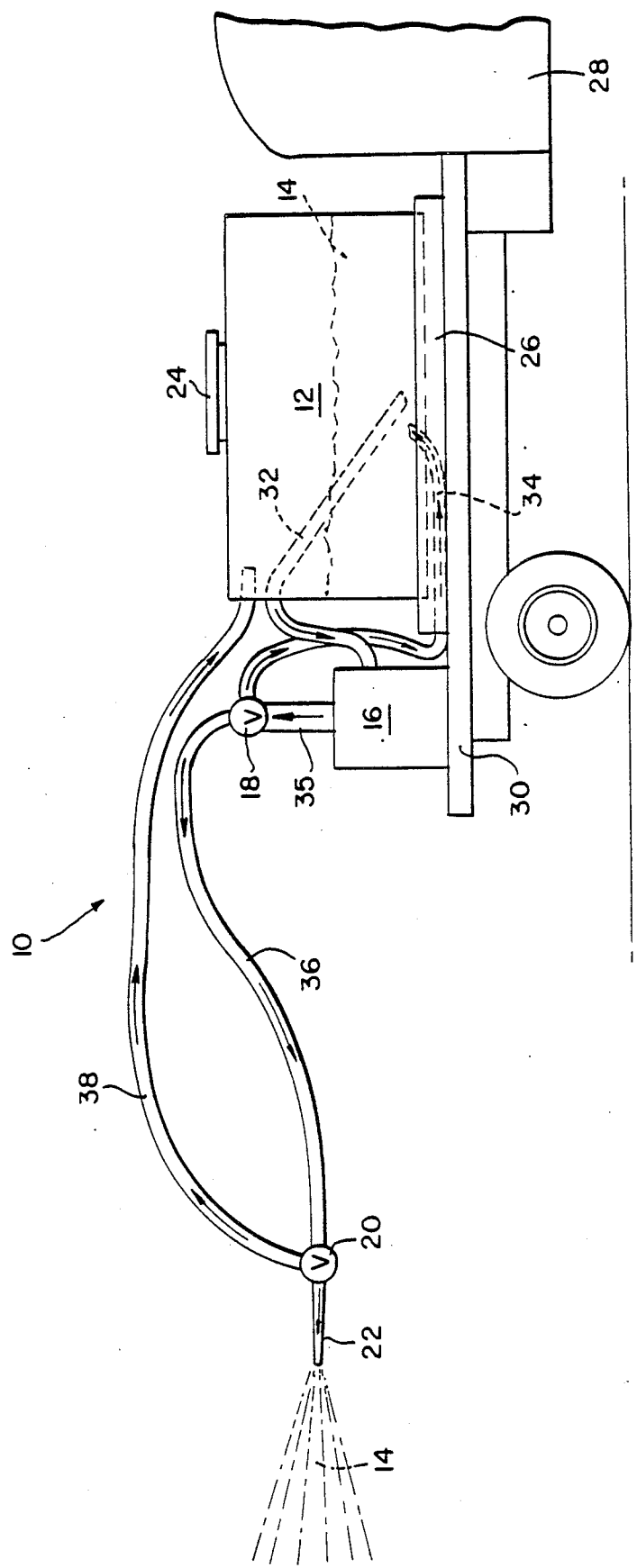
FIG. 1 is an elevational view of the spraying apparatus of the present invention.

The invention 10 comprises the combination of a vehicle-mounted tank 12 holding a mixture 14 of solid and liquid materials; a pump 16; valves 18 and 20; a discharge nozzle 22; and a plurality of flexible hosing or lines 32, 34, 35, 36 and 38 to circulate the mixture as well as to deliver the mixture, under pressure via the pump, to the discharge nozzle 22.

It should be understood that the present invention encompasses all apparatus for spraying any mixture of solid and liquid materials, such as apparatus for spraying concrete slurries, apparatus for spraying paint or chemicals, spraying acoustic ceilings, or the like. The present invention is preferably directed to agricultural apparatus for spraying mixtures composed of seed, water, mulch and/or fertilizer, such as hydroseeders or the like. The present description specifically refers to such hydroseeder for illustrative purposes only.

Tank 12 is removably or permanently mounted to a flatbed 30 of truck 28. Of course, this is only one embodiment. The tank 12 can be placed, for example, on a trailer, on a skid, in a van or merely provided with its own wheels. The bed 30 includes a raised platform or rails 26 which allows the tank 12 to be seated in an elevated position above the truck's bed, forming a space between the bottom of the tank and the bed of the truck. The tank, although not limited thereto, is generally cylindrical in shape, preferably formed of metal material, and may have approximately a 200 gallon holding capacity. An inlet port 24 is provided in the top portion of the tank for delivering a mixture of grass seed, water and mulch (coverage verifier), not necessarily at the same time (mixing operation is discussed below).

A hydraulic pump 16, having an inlet and an outlet, is either secured to the tank or removably mounted on the truck's bed adjacent the tank. The pump may be driven by a conventional motor (not shown) which can be either self-contained within or mounted adjacent to the pump housing. The motor can operate on either D.C. or A.C. current or driven by a gasoline generator (not shown). An inlet line 32, from the tank delivers the mixture to the pump's inlet. The intake of inlet line 32 is positioned sufficiently below the surface of the mixture, preferably positioned near the bottom of the tank, so as to completely deplete the mixture as desired. Due to the fact that the solid components of the mixture will have a tendency to settle near or on the tank's bottom, the intake of inlet line 32 is preferably positioned near the bottom of the tank, although not phsycially on the bottom itself, to assure proper uniform circulation of all component materials of the mixture throughout the system. As the mixture leaves the pump's outlet through line 35, the mixture enters first valve means 18, where the mixture is either completely recycled back to the tank through a pump return line 34 (full recycle), completely delivered to nozzle 22 through nozzle supply line 36 (full spray), or partially returned to the tank and partially delivered to the nozzle (partial spray, partial recycle). Pump return line 34 enters the tank at its bottom through the space between the tank's bottom and the bed of the truck. Recycling mixture from the bottom of the tank facilitates continuous agitation of the mixture within the tank by a bubbling effect of the mixture when it reenters the tank from the pump, thus eliminating the need for an in-tank agitating apparatus. While the return line 34 preferably enters the tank at its bottom for the above reasons, it may also be designed to enter the top of the tank and connect to a sparger tube (not shown) having multiple spray jets which cause the recycle to spray into the tank at a plurality of positions, thereby also maintaining agitation of the contents 14 of the tank 12. Such a tube may also be placed along the bottom of tank 12 in the embodiment of FIG. 1 to cause the recycling mixture to be forced upward at a plurality of locations. It is preferred that some degree of recycle always take place, even when maximum spray pressure is desired, to maintain agitation within the tank at all times. Otherwise, a non-homogeneous mixture could be fed to the nozzle 22.

Figure 4:
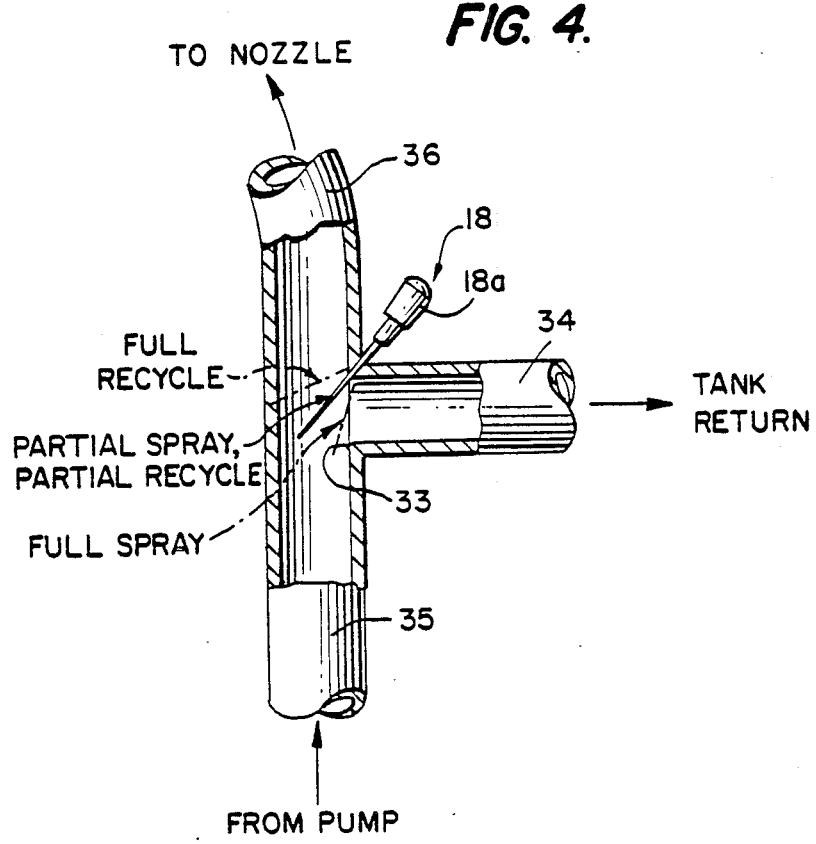
FIG. 4 is a partial sectional view of one embodiment of a pump recycle valve arrangement which may be employed in the present invention.

As best seen in FIG. 4, valve means 18 may be a pivotal conventional gate valve 18a, for regulating the respective amounts of mixture to return to the tank and/or to be delivered to the discharge nozzle 22. A nozzle supply line 36 delivers the mixture to a second valve 20, which is positioned to abut the nozzle 22. Valve 20 regulates the flow of the mixture to be dispensed from the nozzle, as well as the flow of the mixture to be recycled back to the tank through nozzle return line 38. The outlet of nozzle return line 38 is positioned to enter the upper region of tank 12 although it may also be designed to feed into the bottom of tank 12 as does line 34.

The nozzle valve 20 may be a pivotal conventional gate valve 20a (see FIG. 2), for regulating the respective amounts of mixture to be either delivered to the discharge nozzle and/or to be recycled back to the tank. When, for example, the nozzle is not in use, valve 20a is controlled manually to deliver the entire mixture passing through nozzle supply line 36 to nozzle tank return line 38 (see the dashed line in FIG. 2 marked "full recycle"). When maximum spray from the nozzle is required, nozzle valve 20a is manually operated to shut off the nozzle return line, thereby delivering the entire mixture from the nozzle supply line 36 to the nozzle 11 (see the dashed line in FIG. 2 marked "full spray"). Under conditions when a partial spray is desired or a spray of a specific configuration, nozzle valve 20a is controlled manually to a position intermediate the two extremes which will allow a portion of the mixture to be dispensed by the nozzle as well as a portion of the mixture to be recycled back to the tank via nozzle return line 38.

Figure 2:
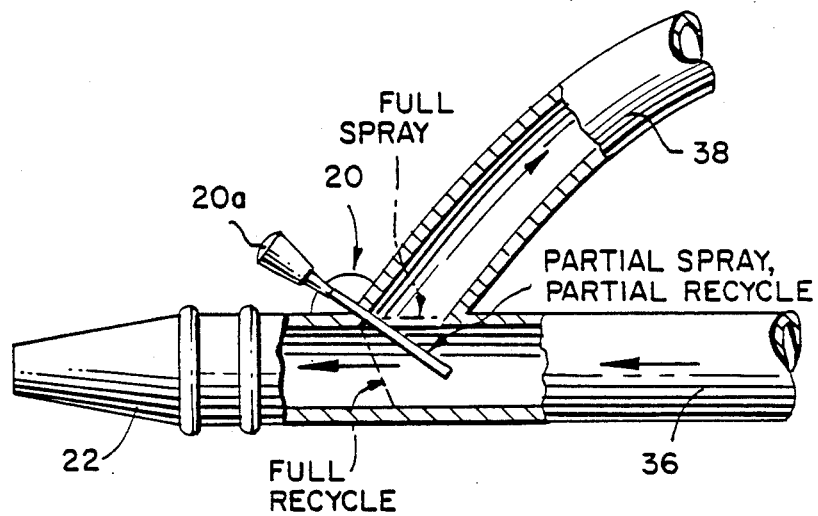
FIG. 2 is a partial sectional view of one embodiment of a nozzle valve arrangement which may be employed in the present invention.

The discussion about the operation of nozzle valve 20a in FIG. 2 applies equally as well for pump valve 18a in FIG. 4. However, for the pump valve 18a, it is desired to constantly permit some degree of recycle. Thus, a projection 33 can be placed so as to prevent the return line 34 from ever being completely closed off.

Figure 3:
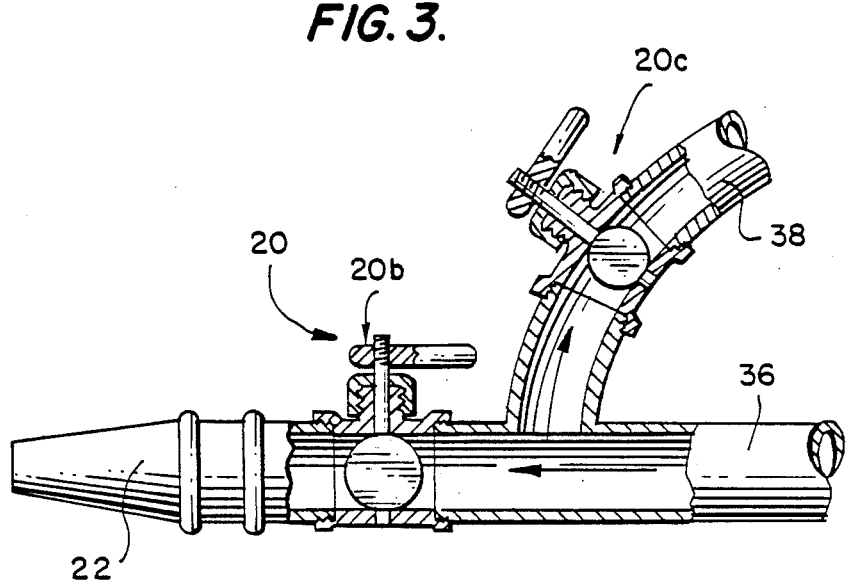
FIG. 3 is a partial sectional view of another embodiment of a nozzle valve arrangement which may be employed in the present invention.
Figure 5:
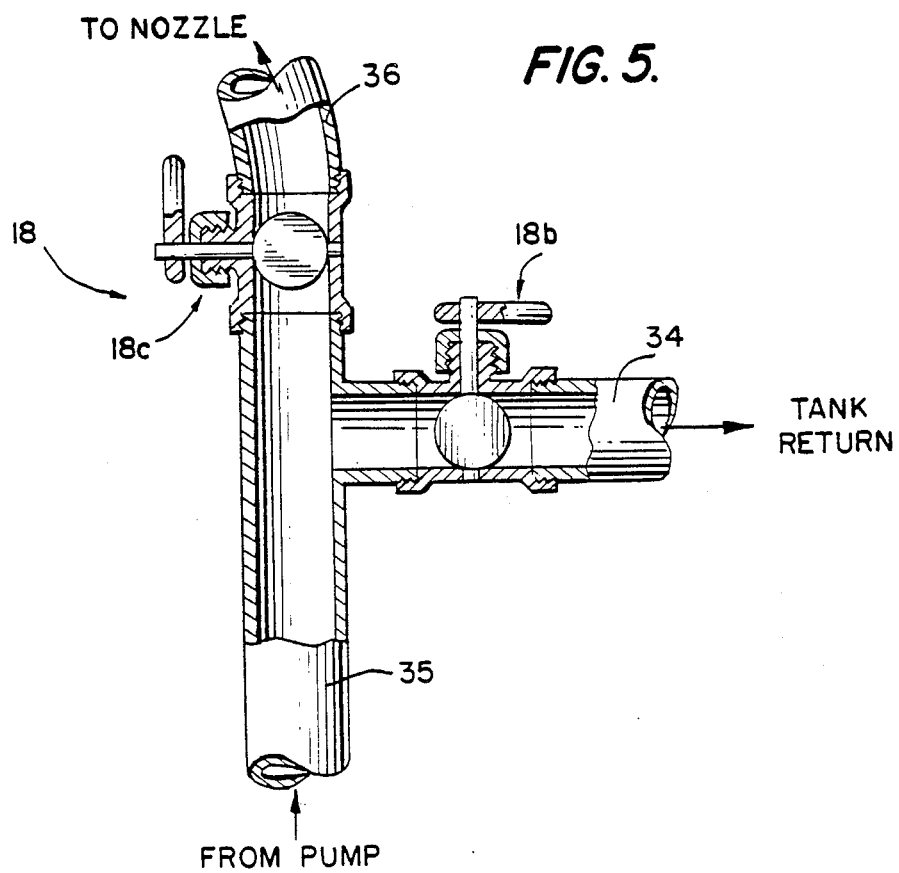
FIG. 5 is a partial sectional view of another embodiment of a pump recycle valve arrangement which may be employed in the present invention.

It should be understood that other valve arrangements may be employed in the present invention. Referring now to FIG. 3, nozzle valve 20 may include the use of two adjacent gate valves or ball valves 20b, 20c. Valve 20c abuts the nozzle assembly and valve 20c is positioned near the intake portion of nozzle return line 38. This facilitates a more controllable regulation of the mixture passing therethrough. Likewise, pump valve 18 (see FIG. 5), may comprise the use of two adjacent gate valves 18b, 18c, valve 18b being positioned near the intake end of pump return line 34 and valve 18c being positioned in line 36 just downstream of the intersection with line 34.

The particular valve construction used is not a critical feature of the present invention. Any type of valve which permits fluid to be directed entirely to one of two outlets, entirely to the other outlet or any mixed position therebetween may be used. Various types of ball valves known to the art are particularly applicable.

As discussed earlier, the mixture may comprise grass seed, water and mulch (solid and liquid materials). In operation, pump valve 18 is configured so as to be open to the pump return line and closed to the nozzle supply line, water is added to the tank and pump 16 is started. When water is circulating, mulch is added (25 pounds per 100 gallons of water). After mulch and water have fully circulated, grass seed is added (15 pounds per 100 gallons of water). Agitation of the mixture is complete when the mixture is flowing smoothly. When spraying of the mixture is desired, pump valve 18 is closed two-thirds of the way to the pump return line leaving a one-third opening for the return of the mixture for tank agitation. Nozzle valve 20 is configured so as to be fully open to recycle. Then nozzle valve 20 is manipulated by the operator to open it a desired degree to obtain the desired configuration of spray. When a full spray is desired, nozzle valve 20 is closed to the nozzle return line. When the nozzle is not in use, nozzle valve 20 is closed to the nozzle and opened to the nozzle return line. The system may be shut down by closing pump valve 18 to the nozzle supply line and turning off the pump. The entire system is then emptied and flushed with water.

It should be understood that the location of the nozzle valve 20, being in abutment with nozzle 22, assures elimination of mixture clogging usually associated with nozzle sprayers. The present invention permits flow of the mixture in varying degrees at various points in the systems circulating path.

The nozzle 22 may be of any desired configuration. For example, if the present invention is being used to spray paint which must be kept in constant agitation to prevent solidification, the nozzle may be a conventional paint spray gun. Any type of spray gun or nozzle may be used depending on the particular materials being sprayed, all as would be well known to those of ordinary skill in the art.

It will be obvious to those skilled in the art that various other changes and modifications may be made without departing from the scope of the invention and the invention is not to be considered limited to what is shown in the drawings and descibed in the Specifications.

What is claimed is:

1. An apparatus for spraying mixtures of solid and liquid materials onto any desired area, comprising:
   a tank;
   a pump;
   an inlet line from said tank to said pump;
   a return line from said pump to said tank;
   a discharge nozzle;
   a nozzle supply line from said pump to said discharge nozzle;
   first valve means for regulating the respective amounts of mixture being fed to said return line and to said nozzle supply line;
   a nozzle return line from said nozzle supply line to said tank, said nozzle return line intersecting said nozzle supply line at said nozzle; and
   second valve means, at said intersection of said nozzle return line and said nozzle supply line, for regulating the respective amounts of mixture being fed to said discharge nozzle and to said nozzle return line, said second valve means being regulatable among a first configuration at which all flow in said nozzle supply line enters said nozzle, none being recycled through said nozzle return line, a second configuration at which all flow in said nozzle supply line enters said nozzle return line, none entering said nozzle, and intermediate configurations permitting varying ratios of flow to said nozzle and said nozzle return line.

2. An apparatus in accordance with claim 1, wherein said mixture comprises seed, mulch and water.

3. An apparatus in accordance with claim 1, wherein said first valve means comprises a gate valve.

4. An apparatus in accordance with claim 1, wherein said first valve means comprises two separate and adjacent gate valves, one in said nozzle supply line downstream of the intersection with said return line and one in said return line near the intersection with said nozzle supply line.

5. An apparatus in accordance with claim 1, wherein said second valve means comprises a gate valve.

6. An apparatus in accordance with claim 1, wherein said second valve means comprises two separate and adjacent gate valves, one in said nozzle supply line immediately upstream of the intersection with said nozzle return line and one in said nozzle return line immediately downstream of the intersection with said nozzle supply line.

7. An apparatus in accordance with claim 1, wherein said tank and said pump are vehicle mounted.

8. An apparatus in accordance with claim 1, wherein said nozzle return line enters the top region of said tank.

9. An apparatus in accordance with claim 1, wherein said inlet line from said tank to said pump, further includes an inlet end, said inlet end being positioned near the bottom of said tank.

10. An apparatus in accordance with claim 1, wherein said return line from said pump to said tank has an outlet end, said outlet end being positioned to enter said tank from the underside of said tank.

11. An apparatus in accordance with claim 1, wherein said first valve means includes protection means for preventing said first valve means from completely closing off said return line, whereby some degree of recycle constantly occurs.

* * * * *